United States Patent

Darrow

[15] 3,657,601
[45] Apr. 18, 1972

[54] VITAL VEHICLE BRAKE ASSURING AND WHEEL SLIP

[72] Inventor: John O. G. Darrow, Murrysville, Pa.

[73] Assignee: Westinghouse Air Brake Company, Swissvale, Pa.

[22] Filed: Feb. 16, 1971

[21] Appl. No.: 115,491

[52] U.S. Cl. ............................................. 317/5, 246/182 R
[51] Int. Cl. ........................................................... B61b 13/6
[58] Field of Search .................................................... 317/5

[56] References Cited

UNITED STATES PATENTS

| | | | |
|---|---|---|---|
| 3,274,443 | 9/1966 | Eggenberger et al. | 317/5 |
| 3,340,883 | 9/1967 | Peternel | 317/5 |
| 3,418,528 | 12/1968 | Watanabe et al. | 317/5 |
| 3,464,432 | 9/1969 | Schleif | 317/5 |

Primary Examiner—L. T. Hix
Attorney—H. A. Williamson, A. G. Williamson, Jr. and J. B. Sotak

[57] ABSTRACT

A fail-safe deceleration and wheel slip detection circuit which includes a signal generator for producing signals having a frequency proportional to the speed of a vehicle, a converter for converting the frequency of the signals to a proportional voltage signal, a differentiator for differentiating the voltage signal and for producing a rate of change signal, a multivibrator powered by the rate of change signal for producing output signals proportional thereto, an amplifier-rectifier for amplifying and rectifying the output signals, a level detector for measuring the amplitude of the amplified-rectified signals and energizing a utilization device when and only when the amplitude of the signals exceeds a predetermined minimum level, thereby signifying that the vehicle is decelerating at a sufficient rate, and a wheel slip detector for indicating excessive slippage of a wheel of the vehicle.

10 Claims, 1 Drawing Figure

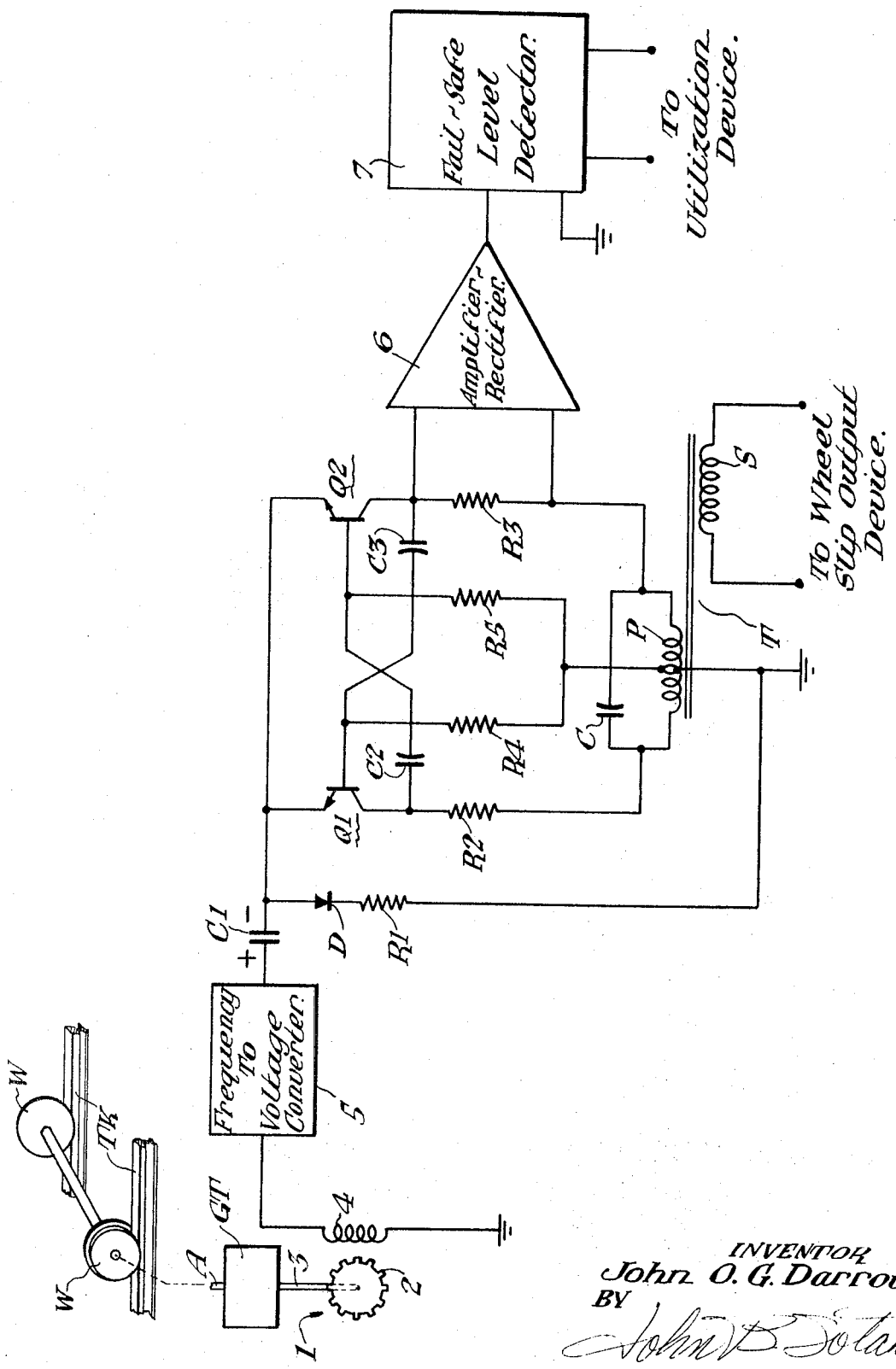

VITAL VEHICLE BRAKE ASSURING AND WHEEL SLIP

My invention relates to a vital vehicle brake assuring and wheel slip detecting circuit arrangement and more particularly to a deceleration measuring and excessive wheel slip detecting circuit for a speed control system which operates in a fail-safe manner.

In automatic railroad and mass and/or rapid transit applications, it is essential to measure the decelerating rate of a moving vehicle in order to reduce vehicle speed or to stop the vehicle within a prescribed distance. For example, in vehicle cab signal systems, it is a required practice to ensure that sufficient vehicle braking action be initiated once an overspeed condition has been established. That is, if a more restrictive speed command is received by a vehicle while it is enroute it is necessary to apply the service brakes to cause the vehicle to slow down at a given decelerating rate. In station stopping operations, it has been found that a decelerating rate of two (2) miles per hour per second allows for safe stopping action to occur without physical discomfort to passengers or individuals riding the vehicle. It will be appreciated that in order to reduce the possibilities of damage to the equipment and danger of injury or death to the attending individuals and passengers, the decelerating measuring operation must be accomplished in a vital manner. Thus, the decelerating measuring apparatus should preferably function in a fail-safe manner in order to ensure that a critical circuit or component failure can not result in simulating a higher than actual vehicle decelerating rate. In the past, the vehicle decelerating rate was measured by inertial devices which were not entirely satisfactory in some respects. For example, inertial devices are sensitive to centrifugal or gravitational forces, such as those produced when the vehicle negotiates curves or moves up and down grades in the roadway. It has been recognized that a five (5) percent grade causes approximately one (1) mile per hour per second rate change which is equivalent to a fifty (50) per cent uncertainty factor when a two (2) mile per hour per second deceleration rate is employed in braking the vehicle. Thus, in previous speed control systems, an uncertain amount of error was introduced by the inertial type of decelerometer whenever the vehicle ascends or descends grades or negotiates curves in the trackway. Therefore, it is advisable and desirable to avoid the use of moving weights or swinging masses for measuring the deceleration rates of moving vehicles. It is a further advantage in vehicle speed control systems to provide a wheel slip detector to determine whether excessive wheel slippage is occurring during periods of deceleration. Wheel slip not only results in physical damage to the wheel, such as flat spots on its tread but also could cause a false deceleration indication when the slipping wheel is, in fact, the driving wheel of the vehicle speed signal generator. Wheel slip may occur during braking as a result of locked brake or excessive braking action. In the present case, it has been assumed that a decelerating rate in excess of, for example, six (6) miles per hour per second is indicative of excessive wheel slip. Thus, during braking a deceleration exceeding six (6) miles per hour will cause an excessive wheel slip indication.

Accordingly, it is an object of my invention to provide a new and improved deceleration measuring and wheel slip detecting arrangement which is insensitive to terrestial forces.

A further object of my invention is to provide a vital type of deceleration measuring and wheel slip detecting circuit which accurately measures the decelerating rate of moving vehicles.

Another object of my invention is to provide a vital brake assuring and excessive wheel slipping circuit arrangement for measuring the decelerating rate of guided types of moving vehicles.

Yet a further object of my invention is to provide a unique fail-safe circuit arrangement for measuring the deceleration of moving objects and for determining when excessive wheel slipping occurs during periods of deceleration.

Yet another object of my invention is to provide a new deceleration measuring and excessive wheel slip indicating circuit for a vehicle speed control system which is insensitive to inertia forces produced by the vehicle moving along the trackway.

Still a further object of my invention is to provide a novel braking assuring and wheel slip detecting circuit arrangement which accurately measures the decelerating rate of moving vehicles and which indicates excessive wheel slippage of the moving vehicles.

Still another object of my invention is to provide a fail-safe vehicle deceleration measuring and wheel slip detecting circuit which is unaffected by the topography of the ground upon which the vehicle moves along on its route of travel.

Still yet a further object of my invention is to provide a new and improved guided vehicle deceleration measuring and wheel slip detecting circuit which operates in a fail-safe manner.

Still yet another object of my invention is to provide a vital deceleration measuring and wheel slip detecting circuit arrangement which is economical in cost, simple in construction, reliable in operation, durable in use, and efficient in service.

In accordance with the present invention, the vital braking assuring and wheel slip detecting circuit measures the decelerating rate of a moving vehicle and provides an indication when excessive wheel slippage occurs. An electric speedometer measures the speed of the moving vehicle and provides a signal having a frequency proportional to the vehicular speed. A converter changes the frequency of the signal into a voltage signal having an amplitude proportional to the frequency. The voltage signal is applied to a differentiator which produces a current signal proportional to the rate of change of the voltage signal. The current signal is employed to power a free-running multivibrator which produces signal pulses having a value proportional to the deceleration rate of the moving vehicle. The signal pulses are applied to an amplifier-rectifier which converts them to a d.c. signal. The signal pulses also feed a wheel slip detector which is tuned to the normal frequency of oscillation of the multi-vibrator. The d.c. signal from the amplifier-rectifier is applied to a fail-safe level detector which measures the d.c. signal level and produces an output when the d.c. signal level exceeds a predetermined minimum value. The output signal from the level detector is applied to a suitable utilization device which deactivates an alarm or emergency brake circuit when the deceleration rate of the moving vehicle is above a given value. If the vehicle deceleration rate is below the given value, the alarm is sounded so that precautionary measures may be manually instituted by the motorman or the emergency brake circuit is energized to automatically bring the vehicle under control. If the current signal powering the free-running multivibrator exceeds a predetermined maximum value, the normal frequency of oscillation of the multivibrator will shift and cause the wheel slip detector to cease producing an output having the tuned frequency.

The foregoing objects and other attendant features and advantages will be more readily appreciated as the subject invention becomes better understood by reference to the following detailed description when considered in conjunction with the accompanying drawing wherein:

The single FIGURE is an electrical schematic diagram of a fail-safe deceleration measuring and wheel slip detecting circuit arrangement for use in vehicle speed control systems in accordance with the present invention.

Referring to the single figure of the drawing, there is shown a preferred embodiment of a fail-safe deceleration measuring and wheel slip detecting circuit of the present invention. The actual speed of a moving vehicle may be obtained from a suitable sensing device, such as an axle driven generator 1 which delivers a source of signals whose frequency is directly proportional to the velocity of the moving vehicle. As shown, the frequency generator includes a rotatable armature 2 having its shaft 3 mechanically coupled to the axle of the vehicle through a suitable gear train GT or the like. The gear train GT is coupled to an axle A which is driven by a wheel W as the vehicle moves along the tracks TK. The armature 2 is constructed of magnetic material which may be permanently magnetized in a conventional manner. The periphery of the aramture 2 is provided with a plurality of equally spaced radially extending teeth, and the rotation of the armature 2 causes the teeth to sequentially pass adjacent a detection means. That is, the frequency generator 1 includes a stator or field winding 4 which detects rotational movement of the armature 2. Thus, a.c. signals are induced into winding 4 by the passing permanently magnetized teeth when angular rotation is imparted to the armature 2 during movement of the vehicle. As shown, one end of the field winding 4 is grounded while the other end is connected to a frequency-to-voltage converter 5. Thus, the frequency of the induced signals is directly proportional to the revolutions per minute and the number of teeth formed on the armature 2. It will be appreciated that other speed sensing devices may be employed with equal effectiveness in deriving a representative speed signal, such as, an optoelectronic generator or the like.

The converter 5 produces an output voltage having an amplitude which is proportional to the frequency of the signals induced in winding 4. The frequency converter 5 may take the form of any suitable type of converter which can safely ensure that no failure will cause erratic operation, and particularly, one that will not produce an abnormal or increased voltage level during a component or circuit failure. The converter 5 is preferably arranged to provide a positive voltage, the purpose of which will be described in detail hereinafter. In actual practice, the output voltage is chosen to be relatively high, namely, two hundred (200) volts when the vehicle is traveling at one hundred (100) miles per hour. As previously mentioned, a safe and smooth deceleration rate has been found to exist at a two (2) mile per hour per second rate which is electrically equivalent to four (4) volts per second.

As shown, the output voltage from the frequency-to-voltage converter is applied to one plate of a differentiating capacitor C1. The other plate of the capacitor C1 is connected to an oscillator, such as a free-running multivibrator, as will be described presently. It will be appreciated that the differentiating capacitor produces an output proportional to the rate of change of the input voltage supplied by the converter 5. It has been found that with the rate of change of four (4) volts per second and with a differentiating capacitor of ten (10) microfarads, a current of forty (40) microamperes will pass through a load circuit of the multivibrator which has a resistance value of 75 K ohms.

As shown, the right-hand or negative plate of the capacitor C1 is connected to the anode of diode D while the cathode of diode D is connected to ground via resistor R1. The diode D and resistor R1 provide a charging path for capacitor C1. The capacitor C1 supplies the operating power to a pair of silicon type transistors which form the active elements of the free-running multivibrator. It can be seen that the astable or free-running multivibrator includes a pair of amplifying NPN transistors Q1 and Q2 each having an emitter, a collector, and a base electrode. As shown, the emitter electrodes of transistors Q1 and Q2 are connected in common and, in turn, are connected to the negative plate of the capacitor C1. The collector electrode of transistor Q1 is connected to one side of an LC tank circuit composed of a primary winding P of transformer T and a tuning capacitor C, via load resistor R2. The collector electrode of transistor Q2 is connected via load resistor R3 to the other side of the tank circuit which is tuned to the normal resonant frequency of oscillation of the multivibrator. The resistors R2 and R3 are preferably equal and have a resistive value of approximately 75 K ohms. Cross-coupling is provided between the collector and base electrodes of each transistor by a pair of timing capacitors. For example, a first capacitor C2 couples the collector electrode of transistor Q1 to the base electrode of transistor Q2 while a second capacitor C3 couples the collector electrode of transistor Q2 to the base electrode of transistor Q1. The base biasing resistors R4 and R5 of the respective base electrodes of transistors Q1 and Q2 are connected in common and are connected to the center tap of the primary winding P. The center tap of the primary winding P is directly connected to ground. A secondary winding S of transformer T is magnetically coupled to the primary winding P through the magnetic core (not characterized). The secondary winding S is connected trough an amplifier-rectifier network and in turn to a wheel slip output device, such as, a vital relay. Thus, the vital relay is normally energized when the deceleration rate is below a preselected level, as will be described in detail hereinafter.

Additionally, output signals or pulses are also derived from across the collector load resistor R3 and are also derived from across the collector load resistor R3 and are applied to the input of an amplifier-rectifier circuit 6. The amplifier-rectifier circuit is a fail-safe circuit in that no circuit or component failure is capable of increasing its gain characteristics, and, in practice, the amplifier includes two stages. The amplified output from the amplifier is applied to a fail-safe voltage rectifier and voltage doubling circuit which converts the a.c. signals to a d.c. voltage. The amplifier and rectifier may be of the type shown and disclosed in my Letters Patent of the U.S. Pat. No. 3,527,986, issued Sept. 8, 1970. Namely, the amplifier 9 and the rectifier 21, as illustrated in FIG. 2a of U.S. Pat. NO. 3,527,986, make up amplifier-rectifier 6 of the present invention. The output from the amplifier-rectifier is applied to the input of a fail-safe level detector 7.

The fail-safe level detector 7 may be similar to the type shown and disclosed in my copending application for Letters Patent of the United States, Ser. No. 1,970, filed Jan. 12, 1970, entitled "Fail-Safe Circuit Arrangement," which is assigned to the assignee of the present application. Briefly, the fail-safe level detector 7 includes a feedback type of oscillator circuit and a voltage breakdown device. The oscillator employs a transistor amplifier and a frequency determining circuit which is interconnected with the voltage breakdown device for controlling the amount of regenerative feedback and in turn the oscillating condition of the oscillating circuit. In operation, the voltage breakdown device normally exhibits the high dynamic impedance and only assumes a low dynamic impedance when a sufficient d.c. voltage causes the device to break down and conduct. Thus, the oscillator circuit will only produce a.c. oscillations when a d.c. voltage exceeds a predetermined amplitude, thereby causing the voltage breakdown device to exhibit a low impedance so that sufficient regenerative feedback is provided for sustaining oscillation. In the particular instance, the threshold value of the breakdown device of the level detector 7 is set at a level which will correspond to the above-mentioned desired deceleration rate. Namely, when square waves having peak-to-peak values of three (3) volts or more appear across load resistor R3, the amplitude-rectifier 6 will produce sufficient d.c. voltage to cause the breakdown device to conduct so that oscillations will appear on the output of the detector 7. The output derived from the detector 7 is applied to a suitable gated type of utilization device, such as a vital relay which includes at least one back contact for controlling an appropriate alarm or an emergency braking circuit. The utilization device is only activated or capable of being turned on after the reception of a more restrictive command signal so that unnecessary power is not consumed and wasted during normal running conditions. In practice the vital relay and the alarm or emergency braking circuit may be keyed on by the speed command apparatus when a more restrictive signal is received from the wayside.

Turning now to the operation of the present invention, it will be assumed that the vehicle is proceeding at a preselected given speed in accordance with the last speed command signal which was not a more restrictive signal nor a station stopping command. Under this condition, a substantially constant frequency signal is induced in the winding 4 and a substantially constant voltage is being produced by the frequency-to-voltage converter 5. Thus, substantially no current will be drawn by the differentiating capacitor C1 so that no supply current is available for the multivibrator and a quiescent condition will exist.

A steady state of equilibrium is highly unlikely to occur since tractive effort is constantly being applied and removed as the vehicle ascends inclines, descends hills and negotiates curves. It has been found that during periods of acceleration, the emitter-base junction of each of the transistors would tend to Zener or break down at some value normally a plus six (6) volts nominal value. While such a condition is not critical in the operation of the present invention, it will be appreciated that some delay may result in measuring the deceleration rate due to the buildup of positive voltage on the right-hand plate of capacitor C1. Diode D prevents a positive voltage from appearing on the right-hand plate of capacitor C1 during periods of acceleration as will be described hereinafter. The resistor R1, which is of a relatively small value, is employed to prevent current spikes from adversely affecting the circuit when it is turned on.

Let us now assume that as the vehicle proceeds along its route of travel, a more restrictive speed command signal is received from the trackway. In manual operation, the motorman will be instantly alerted by cab signaling to apply the service brakes or, in the case of automatic operation, the car-carried equipment will be automatically controlled to apply the service brakes. As mentioned above, the utilization device is keyed to the speed command apparatus so that the reception of a more restrictive signal causes the utilization device to be activated into operation. Upon application of the service brakes, the vehicle will begin to slow down, thereby causing a reduction in the angular velocity of the armature 2. The change in angular velocity of the armature 2 causes a proportional reduction in the frequency of the signals induced in the winding 4. This reduction in the frequency of the signals is also reflected in a decrease in voltage produced at the output of converter 5. The change in voltage causes the differentiating capacitor C1 to draw current in proportion to the rate of change of the speed of the moving vehicle. When a sufficient amount of current is drawn by capacitor C1 the free-running multivibrator will be powered into operation and square-wave output signals will be developed across the output resistor R3, and a.c. output signals will be induced into secondary winding S from the primary transformer winding P of the tuned circuit. Initially, current will begin to flow in both transistors, but because of the variation of tolerances of the circuit, a slight current increase will occur in either one of the two transistors of the multivibrator. Let us assume that transistor Q2 initially goes into conduction with capacitor C3 fully charged and capacitor C2 discharged. Since capacitor C3 cannot instantaneously change its condition of charge, the base electrode of transistor Q1 is held at a minus (−) level so that transistor Q1 is driven to cutoff. Further, with capacitor C2 discharged, the transistor Q2 goes into heavy conduction. Thus, current flows from ground through the right-hand side of the center tapped primary winding P, through resistor R3, the collector-emitter electrodes of transistor Q2, and through the capacitor C1. During the conduction of transistor Q2, the capacitor C3 will discharge through resistor R4. When the capacitor C3 becomes fully discharged, the negative potential is removed from the base of transistor Q1, and the transistor Q1 goes into conduction. The conduction of transistor Q1 causes the collector to apply a negative potential to the base of transistor Q2 and the transistor Q2 is cut off. The transistor Q1 will remain conducting until transistor Q2 is again turned on which, in turn, causes transistor Q1 to turn off. The conduction of transistor Q1 causes current to flow through the left-hand side of primary winding P which induces a voltage of the opposite polarity into secondary winding S. Such alternate operation will continue so long as current is being drawn by capacitor C1.

It will be appreciated that the pulse length of each alternation is determined by the RC time constants of the circuit. Thus, a.c. output voltage is induced into the secondary winding S and square wave output signals are generated across the resistor R3 which are measured by the fail-safe level detector 7 to indicate whether or not a sufficient deceleration rate is being exercised by the moving vehicle. It will be noted that the potential drop across resistor R3 is a function of the amount of current being drawn by the capacitor C1 which in turn is proportional to the deceleration rate of the moving vehicle. If the deceleration rate of the vehicle is less than two (2) miles per hour per second, the amount of current being drawn by capacitor C1 will be less than forty (40) microamperes. Thus, the voltage developed across the 75 K ohm resistor R3 will have a value of less than three (3) volts peak-to-peak. As previously mentioned, when a voltage of less than three (3) volts appears across resistor R3, insufficient d.c. voltage from amplifier-retifier 6 is applied to the fail-safe level detector 7 so that it remains quiescent and no output signal will appear at its output. The lack of output signifies that the deceleration rate is insufficient to properly slow down the moving vehicle, and thus the utilization device remains deenergized which causes the alarm or emergency braking circuit to become energized, thereby ensuring that appropriate action will be instituted to bring the vehicle under control.

However, if the vehicle is decelerating at a rate of two (2) miles per hour per second or more, voltage developed across resistor R3 will be three (3) volts or more. Under this condition, the d.c. voltage from the amplifier 6 is sufficient to render the fail-safe level detector 7 conductive and an output voltage will appear on its output terminals. Thus, the utilization device will become energized and will the alarm or emergency braking circuit by the opening of a back contact. Hence, an output appearing across the fail-safe level detector 7 indicates that a sufficient vehicle deceleration rate is being achieved so that no emergency brake application is necessary. Now when the vehicle reaches a speed which corresponds to the restrictive speed command signal, the braking effort is removed so that the entire circuit is deactivated. The alarm or emergency braking circuit is also deactivated so that a false alarm or unnecessary braking action will not take place once the vehicle has assumed its appropriate speed.

Now, if the decelerating rate exceeds a predetermined level, namely, six (6) miles per hour per second, a Zenering effect occurs between the base-emitter junction of the silicon transistors which affects normal operation of the multivibrator. That is, a large voltage appears across the base-emitter junctions which causes them to break down or Zener and results in a clipping effect. This base clipping effect tends to raise the frequency of oscillation of the multivibrator very sharply so that the multivibrator will oscillate at a different frequency. Since the tuned circuit composed of capacitor C and winding P is tuned to the normal resonant frequency of the multivibrator the change in frequency dramatically reduces the voltage induced in secondary winding S. The reduction of voltage in the secondary winding S results in the deenergization of the wheel slip output device, namely, causes the vital relay to be dropped. The dropping of the wheel slip relay causes a wheel slip indication to be actuated so that the necessary action may be initiated by the operator or the vehicle-carried equipment. Thus, when an exceedingly high voltage, namely, one produced by a deceleration rate higher than six (6) miles per hour per second, is developed by the signal generator, it is assumed that wheel slippage is present and an indication to that effect is produced by the wheel slip output device.

As previously mentioned, the diode D is employed to prevent a positive voltage from appearing on the right-hand plate of capacitor C1 which would cause a delay in the monitoring of the vehicle deceleration rate. That is, when the vehicle is accelerating, a positive voltage would tend to build up on the right-hand plate of capacitor C1, but diode D will conduct at or near zero volts so that little, if any, positive voltage will appear across the multivibrator. Thus, no positive voltage is allowed to build up on the right-hand plate of capacitor C1 and the vehicle deceleration rate may be immediately measured during periods of deceleration.

As previously mentioned, it will be appreciated that no circuit or component failure is capable of simulating an erroneous deceleration rate. A failure of any component or part in an open-circuit or a short circuit-manner destroys the ability of the presently described vital brake assuring circuit to produce output signals for the utilization device.

For example, a failure occurring in the frequency generator either completely eliminates the presence of a signal or dramatically reduces its level so that an insufficient deceleration signal will be produced at the output of the fail-safe level detector 7.

The frequency to voltage converter 5 can only fail in a safe manner; that is, no failure can cause its output voltage to be larger for a given input frequency. This behavior is easily and naturally obtained for many conventional frequency-to-voltage converters.

The opening or shorting of capacitor C1 destroys the necessary differentiating characteristics of this element, and cannot supply a negative voltage to the multivibrator, since the high voltage supply for capacitor C1 is always positive.

The opening or shorting of the diode D or the opening of resistor R1 are safe failures.

The shorting or opening of any critical element of the multivibrator destroys its amplifying ability so that the output signal will not be developed across the resistor R3.

As previously mentioned, the fail-safe level detector operates in a fail-safe manner so that no output is capable of being produced during a critical component or circuit failure. The opening or shorting of the tuned circuit or the windings of the transformer either destroys the resonant characteristics or reduces the output developed in the secondary winding to a negligible level or to no output at all.

The utilization device may take the form of a vital relay to ensure that an unsafe failure will not occur.

Thus it can be seen that under no circumstance can a false output be developed across the output terminals of the fail-safe detector which could simulate an erroneous deceleration rate.

Further, it is readily understood that the complements of the transistors shown in the drawings may be of the opposite polarity by simply reversing the polarity of the supply source and the diode, as is well known. Further, as previously mentioned, the frequency generator may take the form of an opto-electronic tachometer or the like.

It will also be appreciated that, while this invention finds particular utility in a vehicle speed control system, it is readily evident that the invention is not limited thereto but may be employed in other various systems and apparatus such as motor speed systems or the like, which require securing the safety inherently present in this invention, but regardless of the manner in which the invention is used, it is understood that various alterations may be made by persons skilled in the art without departing from the spirit and scope of this invention. It will also be apparent that other modifications and changes can be made to the presently described invention, and, therefore, it is understood that all changes, equivalents, and modifications falling within the spirit and scope of the present invention are herein meant to be included in the appended claims.

Having thus described my invention, what I claim is:

1. A vital electronic circuit arrangement for use in a vehicle speed control system comprising, a signal generator for producing a signal having a frequency proportional to the speed of the vehicle, a converter coupled to said signal generator for translating the frequency of said signal into a voltage signal, a differentiator coupled to said converter for producing an output signal proportional to the rate of change of said voltage signal, an oscillator having a resonant frequency coupled to said differential and powered by said output signal for producing oscillations having an amplitude proportional to the deceleration rate of the vehicle, an amplifier-rectifier for converting said oscillations to a d.c. signal, a detector coupled to said amplifier-rectifier for detecting the level of said d.c. signal and for producing an output when and only when a predetermined level is reached, a tuned circuit coupled to said oscillator for providing an a.c. output signal only when said oscillator is oscillating at said resonant frequency.

2. A vital electronic circuit arrangement as defined in claim 1, wherein said oscillator is an unstable oscillating circuit.

3. A vital electronic circuit arrangement as defined in claim 1, wherein said oscillator is a free-running multivibrator.

4. A vital electronic circuit arrangement as defined in claim 1, wherein said differentiator includes a capacitor.

5. A vital electronic circuit arrangement as defined in claim 3, wherein said free-running multivibrator is a pair of NPN transistors which are powered by a negative voltage source.

6. A vital electronic circuit arrangement as defined in claim 1, wherein a charging path is coupled to said differentiator.

7. A vital electronic circuit arrangement as defined in claim 6, wherein said charging path includes a diode and a series resistor.

8. A vital electronic circuit arrangement as defined in claim 3, said free-running multivibrator includes a pair of semiconductors.

9. A vital electronic circuit arrangement as defined in claim 8, wherein said semiconductors are silicon transistors.

10. A vital electronic circuit arrangement as defined in claim 1, wherein said tuned circuit includes a parallel resonant circuit including a capacitor and a primary winding of a transistor which includes a secondary winding.

* * * * *

PO-1050
(5/69)

UNITED STATES PATENT OFFICE
CERTIFICATE OF CORRECTION

Patent No. 3,657,601            Dated    April 18, 1972

Inventor(s)    John O. G. Darrow

It is certified that error appears in the above-identified patent and that said Letters Patent are hereby corrected as shown below:

Claim 2, Column 8, Line 27 "unstable" should be "astable"

Claim 10, Column 8, Line 48 "transistor" should be "transformer"

Signed and sealed this 10th day of October 1972.

(SEAL)
Attest:

EDWARD M. FLETCHER, JR.            ROBERT GOTTSCHALK
Attesting Officer                   Commissioner of Patents